United States Patent [19]
Salmela

[11] Patent Number: 5,805,996
[45] Date of Patent: *Sep. 8, 1998

[54] BASE STATION WITH ANTENNA COVERAGE DIRECTED INTO NEIGHBORING CELLS BASED ON TRAFFIC LOAD

[75] Inventor: Mikko Salmela, Masala, Finland

[73] Assignee: Nokia Telecommunications Oy, Espoo, Finland

[ * ] Notice: The term of this patent shall not extend beyond the expiration date of Pat. No. 5,504,937.

[21] Appl. No.: 748,724

[22] Filed: Nov. 14, 1996

Related U.S. Application Data

[63] Continuation of Ser. No. 244,753, filed as PCT/FI92/00328, Dec. 2, 1992, published as WO93/12587, Jun. 24, 1993, abandoned.

[30] Foreign Application Priority Data

Dec. 13, 1991 [FI] Finland ..................................... 915886

[51] Int. Cl.$^6$ ...................................................... H04Q 7/30
[52] U.S. Cl. ........................... 455/453; 455/562; 455/524; 342/367
[58] Field of Search .................................. 455/33.1, 33.2, 455/33.3, 33.4, 56.1, 54.1, 54.2, 422, 450, 453, 464, 517, 524, 561, 562; 379/59; 342/367

[56] References Cited

U.S. PATENT DOCUMENTS

| | | | |
|---|---|---|---|
| 4,249,181 | 2/1981 | Lee | 455/33.3 X |
| 4,727,590 | 2/1988 | Kawano et al. | 455/33.4 |
| 4,759,051 | 7/1988 | Han | 455/33.3 X |
| 5,276,907 | 1/1994 | Meidan | 455/56.1 X |
| 5,303,240 | 4/1994 | Borras et al. | 455/33.3 X |
| 5,355,516 | 10/1994 | Herold et al. | 455/54.2 X |
| 5,428,817 | 6/1995 | Tahagi | 455/33.3 |
| 5,485,631 | 1/1996 | Bruckert | 455/33.4 X |
| 5,504,937 | 4/1996 | Kangas | 455/33.3 |

FOREIGN PATENT DOCUMENTS

| | | |
|---|---|---|
| 399206 | 11/1990 | European Pat. Off. . |
| 416872 | 3/1991 | European Pat. Off. . |
| 458734 | 4/1989 | Sweden . |

OTHER PUBLICATIONS

WO, A1, 9212601, Jul. 23, 1992—p. 11, line 4–line 32.
WO, A1, 9216061, Sep. 17, 1992—p. 2, line 28–p. 4, line 11; p. 5, line 1–line 20.

*Primary Examiner*—Reinhard J. Eisenzopf
*Assistant Examiner*—Philip J. Sobutka
*Attorney, Agent, or Firm*—Cushman Darby & Cushman IP Group of Pillsbury Madison & Sutro LLP

[57] ABSTRACT

A cellular radio system including a plurality of base stations. Each base station includes at least one radio transmitter and receiver, an antenna arrangement which includes at least one antenna having a predetermined radio coverage area, and one or more allocated radio channels for establishing a radio connection with the mobile radio stations within the predetermined radio coverage area. The antenna arrangement can be spatially orientationally directed automatically or by remote control, depending on the time of the day or variation in regional traffic load.

14 Claims, 2 Drawing Sheets

BASE STATION WITH ANTENNA COVERAGE DIRECTED INTO NEIGHBORING CELLS BASED ON TRAFFIC LOAD

This is a continuation of application Ser. No. 08/244,753, filed as PCT/FI92/00328, Dec. 2, 1992 published as WO93/12587, Jun. 24, 1993, which was abandoned upon the filing hereof.

FIELD OF THE INVENTION

The invention relates to a cellular radio system comprising a plurality of mobile radio stations roaming in the system, a plurality of base stations, each base station comprising at least one radio transmitter and radio receiver, an antenna means with a predetermined radio coverage area, and one or more allocated radio channels for establishing a radio connection with the mobile radio stations within the predetermined radio coverage area, at least the base stations with adjacent radio coverage areas having different allocated radio channels.

BACKGROUND OF THE INVENTION

In cellular mobile radio networks, the geographical area covered by the network is divided into radio cells, each of which has at least one base station. A certain number of frequencies (radio channels) are allocated to each base station, and the channels may in turn be shared by a plurality of TDMA (Time Division Multiple Access) traffic channels. The size and distribution of cells and the number of radio channels available to them are typically determined by the traffic capacity demand in the area. However, a cellular mobile radio network may include cells or larger areas where the traffic capacity demand may rise temporarily, e.g. at particular times of the day, to a very high level. If the number of radio channels in a cell is set on the basis of the instaneous maximum capacity demand, the number of radio channels increases, and consequently the amount and cost of radio equipment in a base station also becomes higher. Further, this kind of solution does not result in effective utilization of radio frequencies in a network. On the other hand, if the number of radio channels and the equipment of the base station are not set on the basis of maximum traffic, the number of failed call attempts becomes very high in the area at peak hours.

SUMMARY OF THE INVENTION

The object of the invention is to overcome this problem.

This is achieved by a cellular radio system according to the invention, the system comprising at least one base station including an antenna means that can be directed automatically or by remote control, depending on the time of the day or variation in regional traffic load.

The basic idea of the invention is that at least one base station may, by mechanically re-directing its antenna according to traffic demand, direct part or all of its capacity (radio and/or traffic channels) to the area of the radio cell where the traffic capacity demand has temporarily increased. An advantage of the invention is that the number of channels in a single radio cell need not be set on the basis of an instantaneous maximum capacity demand in the radio cell, but can be set on the basis of an average maximum capacity demand in a plurality of adjacent radio cells. If necessary, the traffic capacity of a single cell may be increased by directing part of the capacity of the neighboring cells thereto, whereby the capacity of the network may be effectively controlled regionally and a higher utilization of the equipment and frequency/traffic channels of the base stations may be accomplished. Also, more effective utilization of radio channels in the entire network is achieved with the invention.

This kind of base station, i.e., with a directable antenna, may also be a so-called extra base station which does not actually have a cell of its own and which is located at the peripheral area of a plurality of cells to selectively increase traffic capacity.

Advantageously, the base station in the system according to the present invention, comprises a drive means for re-directing the antenna by turning it mechanically. This may be performed automatically or manually, remote controlled by an operator, from the control center of the system.

BRIEF DESCRIPTION OF THE DRAWINGS

In the following, the invention is described in greater detail by means of illustrating embodiments with reference to the attached drawing, wherein.

DETAILED DESCRIPTION OF A PREFERRED EMBODIMENT OF THE INVENTION

The invention may be applied to regional control of traffic capacity of a mobile radio network in any digital mobile telephone or mobile radio system, such as the European mobile telephone system GSM (Groupe Special Mobile), and in an analogue mobile telephone or radio system, such as the Nordic Mobile Telephone system NMT. With regard to the basic idea of the invention, the analogue and digital systems are identical, although in a typical analogue mobile radio system one frequency, i.e. radio channel, provides one traffic channel, whereas in a typical digital mobile radio system the traffic capacity is higher since several, typically eight, traffic channels are time-division-multiplexed to each radio channel on a TDMA principle, i.e. on one radio channel there may be up to eight simultaneous connections between a base station and mobile radios. The basic configuration and operation of the GSM and NMT mobile phone systems are well known to those skilled in the art and defined fairly accurately by the specifications of each system.

A mobile radio network may comprise one or more MSC areas, i.e. areas where services are provided by one mobile switching center MSC (mobile exchange). The MSC area may in turn consist of one or more location areas, which are areas covered by a plurality of radio cells. A cell is the smallest geographical area of the system, comprising one or more fixed radio transceivers or base transceiver stations BTS and utilizing predetermined radio channels.

Figure 1:
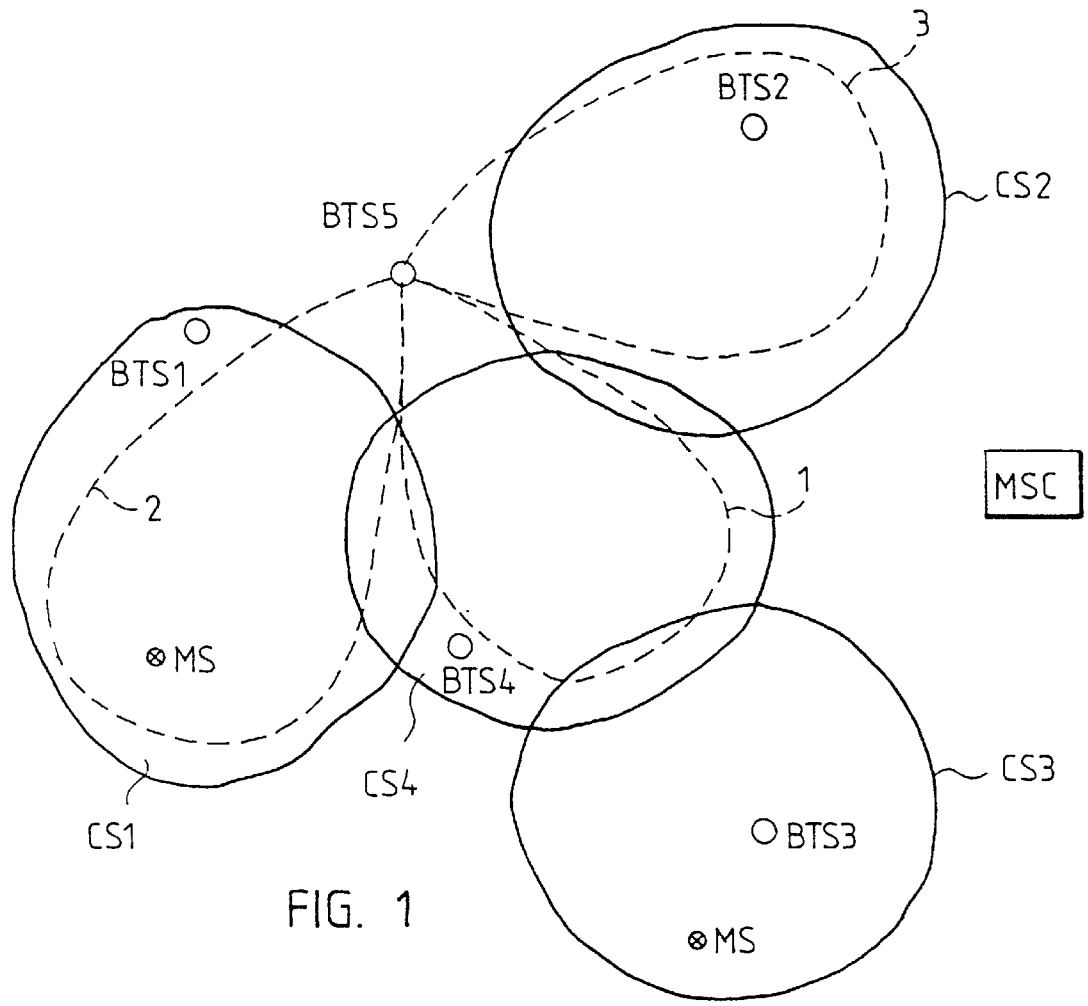
FIG. 1 shows a schematic view of a cellular mobile radio network in which the process of the present invention may be applied.

FIG. 1 shows an embodiment of an MSC area or a location area of a cellular mobile radio network where the present invention may be applied. The geographic area covered by the cellular mobile radio network is divided in an essentially continuous manner into smaller radio areas, i.e.

into radio cells CS1, CS2, CS3 and CS4, such that adjacent radio areas limit one another or overlap in their peripheral areas. Accordingly, in each radio cell CS1 to CS4 there is located at least one fixed radio station or base station BTS1 to BTS4 capable of establishing a connection on the radio channels allocated to it, i.e. pairs of transmitting and receiving frequencies (duplex interval, e.g., 45 Mhz), with the mobile radios MS currently located or roaming in its radio cells CS1 to CS4. It is typical that the radio channels allocated are different, at least in adjacent radio cells. Each base station BTS has also signalling and traffic channel links with a mobile exchange MSC, which controls the operation of one or more base stations within its MSC area. For the sake of simplicity, it is assumed in the embodiment of FIG. 1 that all base stations BTS1 to BTS4 have a common mobile exchange MSC.

Figure 2:
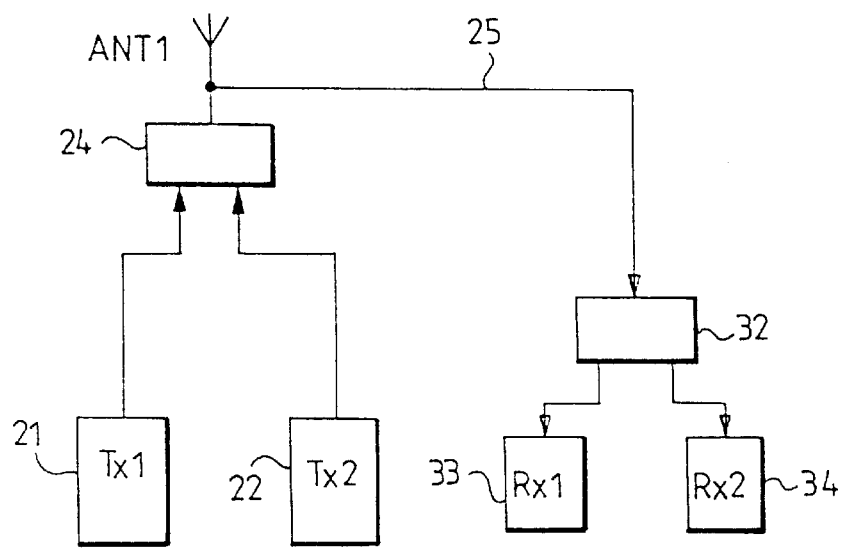
FIG. 2 shows a block diagram of a transmitter section and a receiver section of a base station according to the invention.

Each base station BTS1 to BTS4 of the cellular mobile radio network typically comprises at least one radio transmitter and one receiver; in the embodiment of FIG. 2, there are two radio transmitters 21 and 22 and two radio receivers 33 and 34 connected to an antenna unit ANT1. The size and shape of the radio coverage (radiation pattern) of the antenna unit ANT1 determine the size and shape of the radio cell of the base station. The antenna unit ANT1 may comprise separate antennae for transmitting and for receiving.

In the transmitter section of the base station, radio transmitters 21 and 22 are connected directly to a combiner 24, for combining the radio frequency transmission signals of the radio transmitters 21 and 22 and feeding the combined signal to the antenna unit ANT1.

In the receiver section of the base station, the antenna unit ANT1 is connected to radio receivers 33 and 34 via a distribution amplifier unit 32.

Normally, the base station BTS has a fixed coverage area which is determined by the radiation patterns of one omnidirectional antenna or, alternatively, of one or more directional antennae. All the radio channels of the base station are within the coverage area of the main antenna unit ANT1, i.e., are available to the mobile radios in the radio cell of the base station.

However, situations occur where, e.g., the traffic in the radio cell CS4 may temporarily exceed the capacity of the base station BTS4 of the cell. For example, the area covered by the cell CS4 may include the end of a motorway which is the main entry to the city and where traffic jams usually occur between 7:00 and 8:30 a.m. Correspondingly, the area covered by another radio cell CS1 may include e.g. an industrial and office area where the most telephone traffic occurs between 8:30 a.m. and 4:00 p.m. The cell CS2 may cover an area including a sports stadium or a fair area and the capacity demand for telephone traffic is high when events are organized therein.

If the number of radio channels in the base stations BTS is determined in view of the peak hours, the utilization of the radio channels is low at the system level.

The system of the invention comprises at least one base station having an antenna/antennae directable, depending on the regional variation in traffic load, to the near-by areas currently requiring the most traffic capacity. In the embodiment of FIG. 1, the cells CS1, CS2 and CS4 have in their vicinity a base station BTS5 which has an antenna having a radiation pattern that can, if necessary, be directed alternatively towards the directions 1, 2 and 3, to compensate and eliminate load peaks of telephone traffic in the cells at different times.

Figure 3:
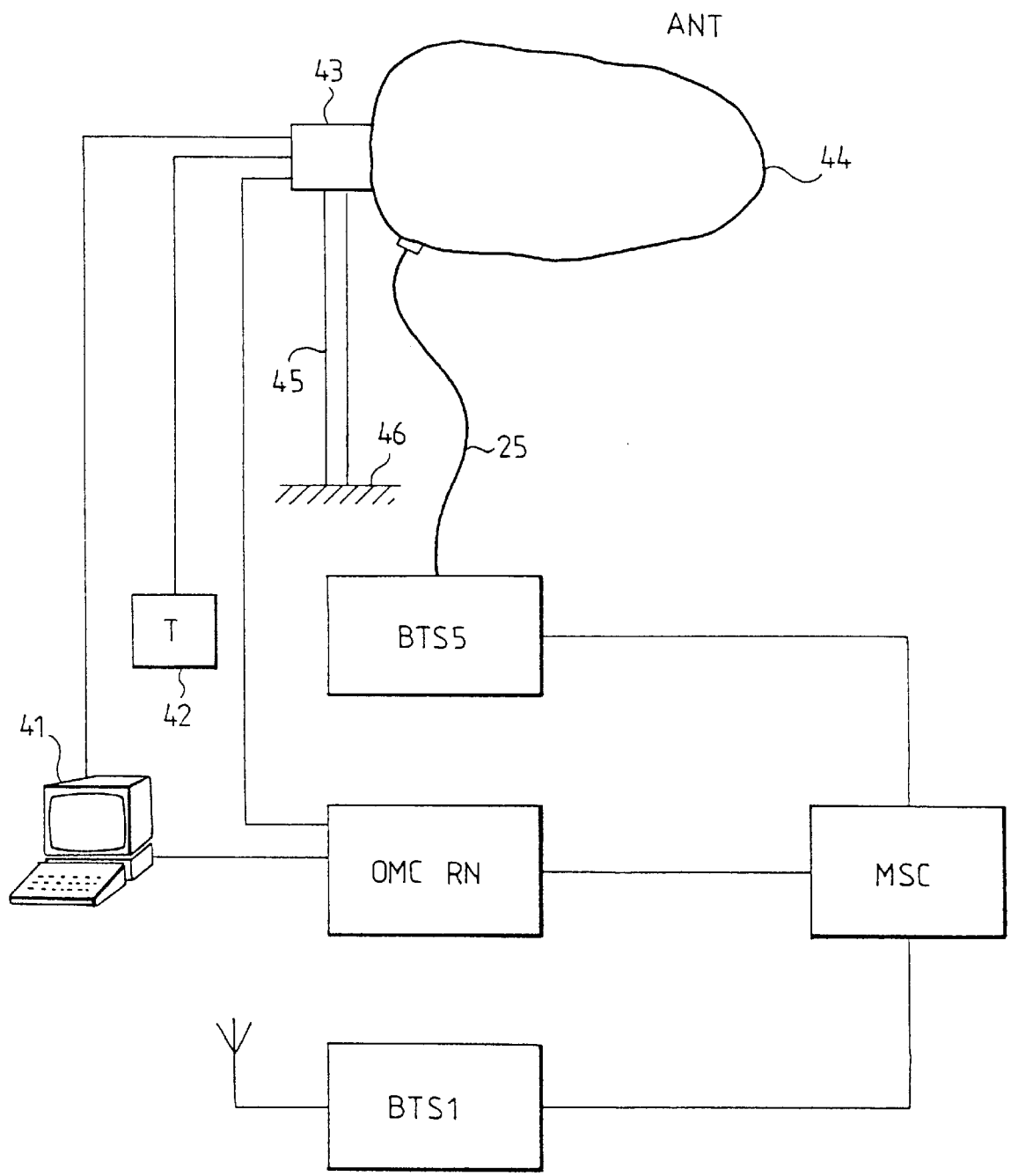
FIG. 3 is a schematic diagram illustrating a few possible ways to control the directing of the radiation pattern of the antenna of the base station.

FIG. 3 illustrates a few possible ways to control the directing of the radiation pattern of the antenna in the base station BTS5. The base station BTS5 is identical to the base stations BTS1 to BTS4 in its basic structure, but, in addition, it includes a mechanical drive means 43 connected to a frame 45 (mast) for re-directing the directional antenna unit 44 (usually includes different antennae for transmitting and receiving) by turning the antenna unit. The drive means is, for example, a step-by-step controllable electric motor 43, which may turn the antenna unit 41 at least in a horizontal plane, advantageously also in a vertical plane. Vertical directability is advantageous, e.g., when the antenna unit is located at a high location, since the antenna unit can then be directed towards a near-by area at a lower level, by inclining the antenna towards the area in a vertical plane. Also, the length of the antenna lobe (radiation pattern) may be affected by turning the antenna in a vertical plane.

The antenna turning means 43 may be controlled in many ways, some of which are illustrated in FIG. 3. The directability of the antenna 44 in response to different times of the day and the corresponding control operations of the turning means 43 may be automatic and permanently programmed to a particular timer unit 42. Thereby, the antenna of the base station BTS5 may be re-directed automatically depending on the time of the day and/or the day of the week, e.g. such that from 7:00 to 8:30 a.m. the antenna of the base station BTS5 assumes the direction 1 (motorway), from 8:30 to 4:00 p.m., the direction 2 (office and industrial area), and when events are arranged at the sports stadium, the direction 3.

Alternatively, the turning means 43 of the antenna 44 may be controlled by remote control from the control center 41 of the radio system, either manually or by preprogramming depending on the time and the loading of the network.

Further, the radio system may comprise a separate capacity-control unit OMCRN, which, depending on the time and/or the loading of the system, automatically directs channel capacity to the loaded areas by controlling, e.g., the antenna-turning unit 43 of the base station BTS5. The system may comprise one OMCRN unit for the entire system or several OMCRN units, each of which controls part of the system. An OMCRN unit also makes it possible to take into account the effect the directing of the antennae has on elsewhere in the radio network. An OMCRN unit or the corresponding operations may also be integrated to a mobile exchange MSC. For example, a mobile exchange MSC (or another element in the network) may, upon detecting overloading of a base station BTS1, generate an alarm to a capacity control unit OMCRN, whereby the OMCRN instructs the turning means 43 of the base station to turn the antenna 44 to the direction 2.

The drawing figures, and the above-provided description made with reference thereto are intended only to illustrate the present invention. In its details, the radio system according to the invention may vary within the scope of the attached claims.

I claim:

1. A cellular radio system, comprising:
   a plurality of mobile radio stations roaming in a space served by the system;
   a plurality of base stations, each comprising:
   at least one radio transmitter;
   at least one ratio receiver;
   an antenna arrangement including at least one antenna operationally associated with at least one of said at least one transmitter and receiver; and
   at least one radio channel allocated to said base station for establishing a radio connection with those of said mobile radio stations which are disposed within a radio coverage of the base station;

at least some of said base stations each having a respective fixed coverage area determined by said antenna arrangement;

at least one said antenna of at least one of said base stations being a directional antenna; and the respective said antenna arrangement including drive means for effectively spatially, orientationally redirecting the radiation pattern produced by the respective at least one said directional antenna in use to at least partially overlap at least a neighboring one of said fixed coverage areas, for providing an additional capacity of at least one radio channel for mobile radio stations within said at least one of said fixed coverage areas, for temporal variations in regional radio traffic load in said system.

2. The cellular radio system of claim 1, wherein:

the coverage areas of at least two of said base stations adjoin and possibly overlap one another, and the respective base stations have mutually differing allocated radio channels.

3. The cellular radio system of claim 1, wherein:

said respective antenna arrangement includes both, at least one transmitting antenna and at least one receiving antenna.

4. The cellular radio system of claim 1, further including:

means for automatically spatially, orientationally redirecting said directional antenna depending on at least one of time of day and day of week.

5. The cellular radio system of claim 1, further including:

means monitoring regional radio traffic in said system, and for automatically spatially, orientationally redirecting said directional antenna depending on sensing of a regional overload of radio traffic in said system.

6. The cellular radio system of claim 1, wherein:

said system is a digital cellular radio system, in which each of said radio channels comprises a plurality of TDMA traffic channel time slots.

7. The cellular radio system of claim 1, wherein:

said system is an analog cellular radio system.

8. The cellular radio system of claim 1, wherein:

said drive means is arranged to effectively spatially, orientationally redirect the radiation pattern of the directional antenna by physically moving the directional antenna.

9. A cellular radio system, comprising:

a plurality of mobile radio stations roaming in a space served by the system;

a plurality of base stations, each comprising:

at least one radio transmitter;

at least one radio receiver;

an antenna arrangement including at least one antenna operatively associated with at least one of said at least one transmitter and receiver; and at least one radio channel allocated to said base station for establishing a radio connection with those of said mobile radio stations which are disposed within a radio coverage area of the base station;

at least one said antenna of at least one of said base stations being a directional antenna; and the respective said antenna arrangement including drive means for effectively spatially, orientationally redirecting the radiation pattern produced by the respective at least one said directional antenna in use, for accommodating temporal variations in regional radio traffic load in said system;

said at least one of said base stations having said directional antenna, being an extra base station located at a margin where coverage areas of at least two others of said base stations adjoin one another.

10. A cellular radio system comprising:

a plurality of mobile radio stations roaming in a space served by the system;

a plurality of base stations, each comprising:

at least one radio transmitter;

at least one radio receiver;

an antenna arrangement including at least one antenna operationally associated with at least one of said at least one transmitter and receiver; and at least one radio channel allocated to said base station for establishing a radio connection with those of said mobile radio stations which are disposed within a radio coverage area of the base station;

at least one said antenna of at least one of said base stations being a directional antenna;

said antenna arrangement, for said at least one of said base stations having said directional antenna, including drive means for effectively spatially, orientationally redirecting the radiation pattern produced by the respective at least one said directional antenna in use, in order to accommodate temporal variations in regional radio traffic load in said system;

said at least one of said base stations having said directional antenna, being an extra base station located at a margin where coverage areas of at least two others of said base stations adjoin one another.

11. A cellular radio system, comprising:

a plurality of mobile radio stations roaming in a space served by the system;

a plurality of base stations, each comprising:

at least one radio transmitter;

at least one radio receiver;

an antenna arrangement including at least one antenna operationally associated with at least one of said at least one transmitter and receiver; and at least one radio channel allocated to said base station for establishing a radio connection with those of said mobile radio stations which are disposed within a radio coverage area of the base station;

at least first and second ones of said base stations each having a respective fixed coverage area determined by said antenna arrangement;

at least one said antenna of at least one of said base stations being a directional antenna; and said antenna arrangement, for said at least one of said base stations having said directional antenna, including drive means for effectively spatially, orientationally redirecting the radiation pattern produced by the respective at least one said directional antenna in use to between a first position in which said radiation pattern at least partially overlaps said fixed coverage area of said first base station, and a second position in which said radiation pattern at least partially overlaps said fixed coverage area of said second base station, for providing an additional capacity of at least one radio channel for mobile radio stations within said fixed coverage areas according to temporal variations in radio traffic load within said fixed coverage areas.

12. A cellular radio system, comprising:

a plurality of mobile radio stations roaming in a space served by the system;

a plurality of radio cells, at least one radio channel allocated to each said radio cell for establishing a radio connection with those of said mobile radio stations which are disposed within said respective cell;

at least one base station having a directional antenna and drive means for effectively spatially, orientationally redirecting the radiation pattern produced by said directional antenna in use to at least partially overlap at least one of said radio cells, for providing an additional capacity of at least one radio channel for mobile radio stations within said overlapping area, in order to accommodate temporal variations in radio traffic load within said at least one cell.

13. A system as claimed in claim 12, wherein said at least one base station comprises at least one of the base stations of said radio cells.

14. A system as claimed in claim 12, wherein said at least one base station is an extra base station located at a margin where at least two of said radio cells adjoin one another.

* * * * *